United States Patent
Bertschinger

(10) Patent No.: US 6,508,150 B1
(45) Date of Patent: Jan. 21, 2003

(54) REVERSIBLE CUTTING TIP, METHOD FOR PRODUCING SUCH CUTTING TIP, TOOL PROVIDED WITH SUCH CUTTING TIPS, AND METHOD FOR CUTTING A WORKPIECE BY USING SUCH CUTTING TIP OR A TOOL PROVIDED WITH SUCH CUTTING TIP

(75) Inventor: Wolfgang Bertschinger, Esslingen (DE)

(73) Assignee: Gebr. Heller Maschinenfabrik GmbH, Nürtingen (DE)

( * ) Notice: Subject to any disclaimer, the term of this patent is extended or adjusted under 35 U.S.C. 154(b) by 0 days.

(21) Appl. No.: 09/161,011

(22) Filed: Sep. 25, 1998

(30) Foreign Application Priority Data

Sep. 27, 1997 (DE) .......................... 197 42 765

(51) Int. Cl.[7] .............................. B23B 1/00; B23B 27/14
(52) U.S. Cl. ............................. 82/1.11; 82/173; 407/1; 407/118; 407/119
(58) Field of Search ............... 407/118, 119, 407/120, 1, 8, 29.1, 29.14, 55; 408/144, 145; 82/1.11, 46, 47, 173

(56) References Cited

U.S. PATENT DOCUMENTS

| 2,846,193 A | * | 8/1958 | Chadderdon | 407/118 X |
| 3,369,283 A | * | 2/1968 | Colding | 407/118 X |
| 4,194,790 A | * | 3/1980 | Kenny et al. | 407/118 X |
| 4,194,860 A | * | 3/1980 | Hopkins | 407/42 |
| 4,561,810 A | * | 12/1985 | Ohno | 407/118 |
| 5,569,000 A | * | 10/1996 | Littecke et al. | 407/119 X |
| 5,722,803 A | * | 3/1998 | Battaglia et al. | 407/119 |
| 5,750,247 A | * | 5/1998 | Bryant et al. | 407/119 X |
| 5,755,536 A | * | 5/1998 | Vollmer et al. | 407/113 |

FOREIGN PATENT DOCUMENTS

| DE | 305189 | * | 4/1955 | 407/118 |
| EP | 480394 | * | 4/1992 | 407/119 |
| FR | 62.025 | * | 12/1954 | 407/118 |
| JP | 403190605 | * | 8/1991 | 407/118 |

* cited by examiner

Primary Examiner—Henry Tsai
(74) Attorney, Agent, or Firm—Gudrun E. Huckett

(57) ABSTRACT

A reversible cutting tip for a cutting tool has a cutting wedge defined by a first face and a first flank. The cutting wedge has a clearance angle of 0° to 3°. The first flank is produced by applying a first coating to the cutting tip and the first face is produced by applying a second coating to the cutting tip. The tool is employed for removing cuttings from a workpiece by the cutting tips and for subsequently smoothing the crack surface of the workpiece, created by removing the cuttings, by employing the first flanks.

9 Claims, 3 Drawing Sheets

REVERSIBLE CUTTING TIP, METHOD FOR PRODUCING SUCH CUTTING TIP, TOOL PROVIDED WITH SUCH CUTTING TIPS, AND METHOD FOR CUTTING A WORKPIECE BY USING SUCH CUTTING TIP OR A TOOL PROVIDED WITH SUCH CUTTING TIP

BACKGROUND OF THE INVENTION

The invention relates to a reversible cutting tip for a cutting tool comprising a cutting wedge defined by a first face and a first flank. The present invention also relates to a method for producing such a reversible cutting tip whereby the cutting tip comprises at least one first face and at least one first flank. The invention further relates to a tool furnished with such a reversible cutting tip and also to a method for cutting a workpiece by using such a reversible cutting tip or a tool provided with such cutting tips.

The movements during a cutting process are relative movements between the cutting edge of the tool and the workpiece. The movements are produced by the machine tool and can be performed linearly, circularly or in any other preferred motion. The cuttings result when the cutting wedge defined by the first flank and the first face, penetrates the workpiece by the effective cutting movement after completion of a feed movement. Cutting wedges consisting of metallic and non-metallic materials are known such as, for example, cutting steel, hard metal, ceramic materials, mixed ceramic materials, corundum, silicon carbide, boron carbide, diamond etc.

Especially hard metal cutting tips can be provided with a very thin surface layer consisting of extremely fine carbide or ceramic materials that provides a considerable increase of wear resistance. The most important coating materials which are applied by vapor deposition in vacuum are TiCN, TiN, $Al_2O_3$, and TiC. Vapor deposition of the coating materials can be performed by physical vapor deposition, chemical vapor deposition, and also arc-physical vapor deposition. Physical vapor deposition (PVD) produces maximum layer thickness of approximately 2 to 5 $\mu$m, the chemical vapor deposition (CVD) produces maximum layer thickness of approximately 12 to 15 $\mu$m, and the arc-physical vapor deposition (arc-PVD) produces a maximum layer thickness of up to 50 $\mu$m. When the tool engages the workpiece, the cutting material or its coating is in surface contact with the workpiece along the first face. The cutting edge is subjected to a wear-inducing load by the cutting movement which results in a flattening of the edge, i.e., the so-called first face and first flank wear. The loading of the surfaces at the cutting wedge by pressure and shearing forces under increased temperature varies however. Therefore, a differentiation between different failure types of the different surface elements is made, for example, first flank wear, crater wear, plastic deformation, notch wear, crack formation, fatigue, splintering, tool breakage, built-up edge formation etc. These wear patterns can occur simultaneously and affect the cutting process and the surface quality at the workpiece. In practice, abrasive wear is acceptable for economic reasons. The length of the service life of the cutting edge is determined as a parameter of passive force, resulting heat, and surface quality. The wear by splintering of the cutting elements is, in general, defined as the end of practical service life.

The cutting wedges are, in general, produced for economic reasons only as small reversible cutting tips in order to be able to use the base body of the tool repeatedly for many service life periods of the cutting tips and in order to require only a minimal use of expensive cutting materials. At the same time, the conventional machining processes must fulfill steadily increasing requirements with regard to precision of the cutting edge (±0.01 mm). When employing sintering repeatable results for multiple charges can only be achieved with additional subsequent grinding processes as a result of shrinkage. Also, high requirements with regard to the quality of the receiving elements for the cutting tips must be fulfilled because they must ensure for multiple service life periods of the cutting tips a precise positioning and securing of the reversible and exchangeable cutting tips. The exchange and attachment of the cutting tips must be performed by qualified personnel because the cleanness of the seats and the repeatable attachment movements affect the precise positioning of the cutting tip.

The cutting edge of conventional cutting tips requires a clearance angle. The constant feed continuously moves the contour produced by the cutting edge into the machining range of the tool. This process requires clearance for milling operations with parallel as well as opposite movement. The smaller the ratio of the cutting tip movement of the cutting velocity vector, the smaller the kinematic need for a clearance angle. Heat development of the workpiece material within the zone behind the cutting edge causes heat expansion and bulging of the surface of the machined workpiece. Because of the return of elastic deformations of the workpiece material by the passive force at the cutting edge, it is advantageous to have a clearance angle. The magnitude of the clearance angle is affected by the ratio of the cutting velocity to the feed velocity as well as the kinematic movement (outer or inner machining, rotating tool or rotating workpiece). For identical cutting parameters the required clearance angle increases with more closely spaced cutting tips. This is advantageous in order to achieve reduced tool change times. Furthermore, the size of the clearance angle is determined by the cutting edge radius. For machining a sensible ratio between the cutting edge radius and the thickness of the cuttings must be determined. Since the possible effective feed per time unit for milling, drilling, and broaching corresponds to the sum of the feed/tooth ration and number of teeth/tool ratio, close spacing between the cutting tips is therefore desirable for economic reasons.

It is therefore an object of the present invention to embody the cutting tip of the aforementioned kind, the method of the aforementioned kind, and the tool of the aforementioned kind as well as the cutting method of the aforementioned kind such that in a simple manner and for extended service life periods of the tool, respectively, its cutting tips a high machining precision at the workpiece can be produced.

SUMMARY OF THE INVENTION

This object is inventively solved for the cutting tip by providing at that cutting wedge a clearance angle between 0° and approximately 3°.

In the inventive method for producing the inventive cutting tip, the first face and the first flank are respectively produced by applying at least one coating onto the cutting tip such that the clearance angle of the first flank is between 0° and approximately 3°.

The inventive tool is characterized in that the cutting edges of the cutting tips are positioned about the circumference of the tool on an imaginary cylindrical mantle or any other suitable contour having radial symmetry.

The inventive cutting method is characterized in that the first flank is employed for smoothing the crack surface of the workpiece resulting from the removal of the cutting.

In the inventive cutting tip the clearance angle at the cutting edge is in the range of 0° to approximately 3°. This minimal clearance angle, which can even be 0°, provides in a simple manner a reliable and satisfactory machining product. When the clearance angle is 0°, a cutting surface is provided which extends rearwardly from the cutting edge. For a sufficient stabilization of the cutting edge the portion of the cutting tip penetrating into the workpiece surface is reduced to a minimum.

The inventive method allows the production of the cutting tip in an inexpensive and simple manner. The first face, respectively, the first flank are produced at the cutting tip by applying a coating. This is possible in a simple manner. The cutting elements provided within the respective coatings can be selected according to the desired machining action to be performed with the cutting tip and according to the resulting load forces.

The inventive rotary tool has the cutting edges of the cutting tips positioned about the circumference of the tool on an imaginary cylindrical mantle or any other suitable contour of radial symmetry.

When employing the inventive tool for machining or cutting, respectively, when employing the inventive cutting tips, the first flank will smooth the crack surface at the workpiece directly after removal of the cutting from the workpiece. In this manner, it is possible to perform roughing and smoothing in a single working step. The smoothing effect eliminates the rough peaks within the crack surface of the workpiece resulting from removal of the cutting so that a subsequent finish machining or post-machining of the workpiece is no longer required.

BRIEF DESCRIPTION OF THE DRAWINGS

The object and advantages of the present invention will appear more clearly from the following specification in conjunction with accompanying drawings, in which.

DESCRIPTION OF PREFERRED EMBODIMENTS

Figure 1:
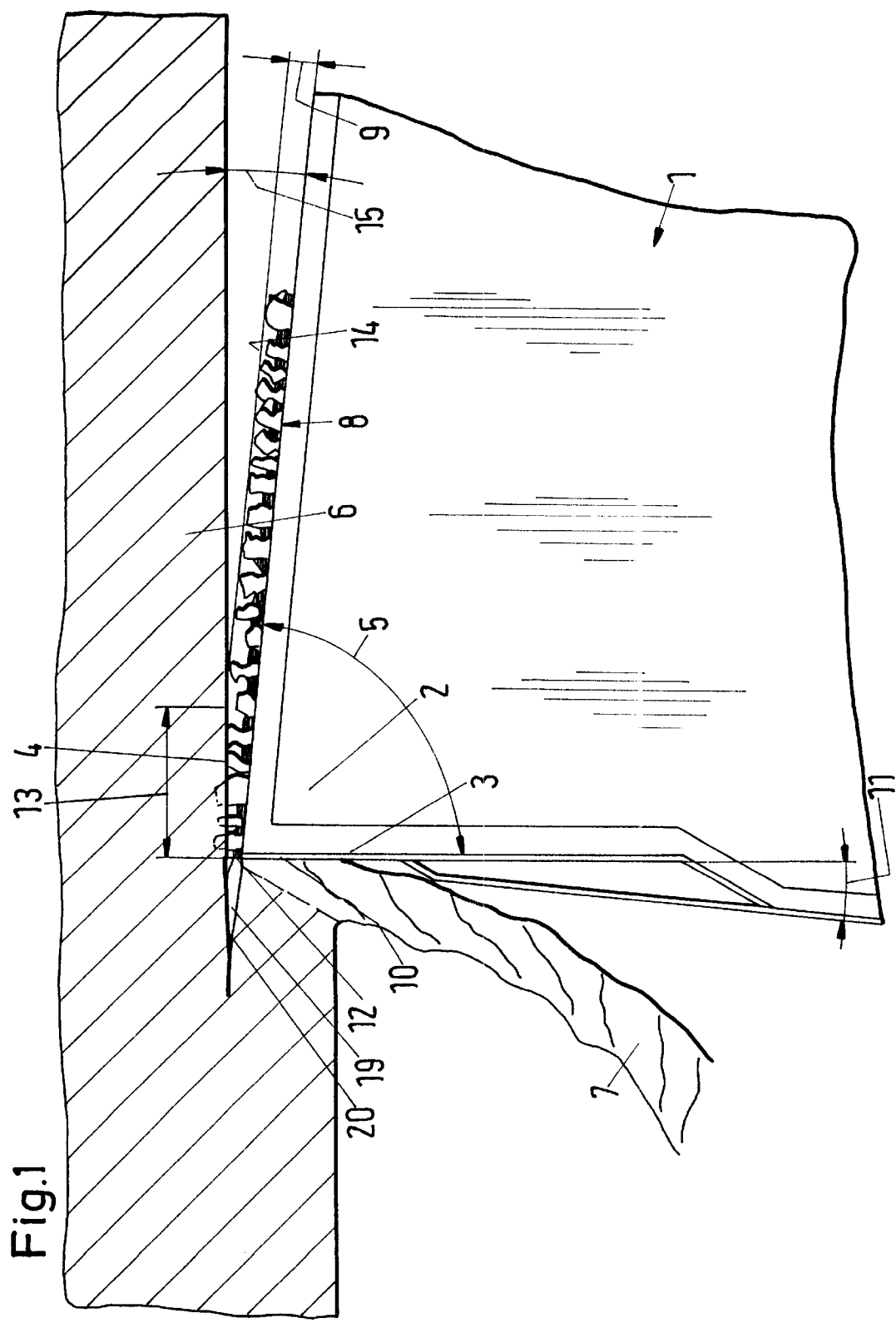
FIG. 1 shows a cutting wedge of the inventive tool with which a cutting is removed from the workpiece.
Figure 2:
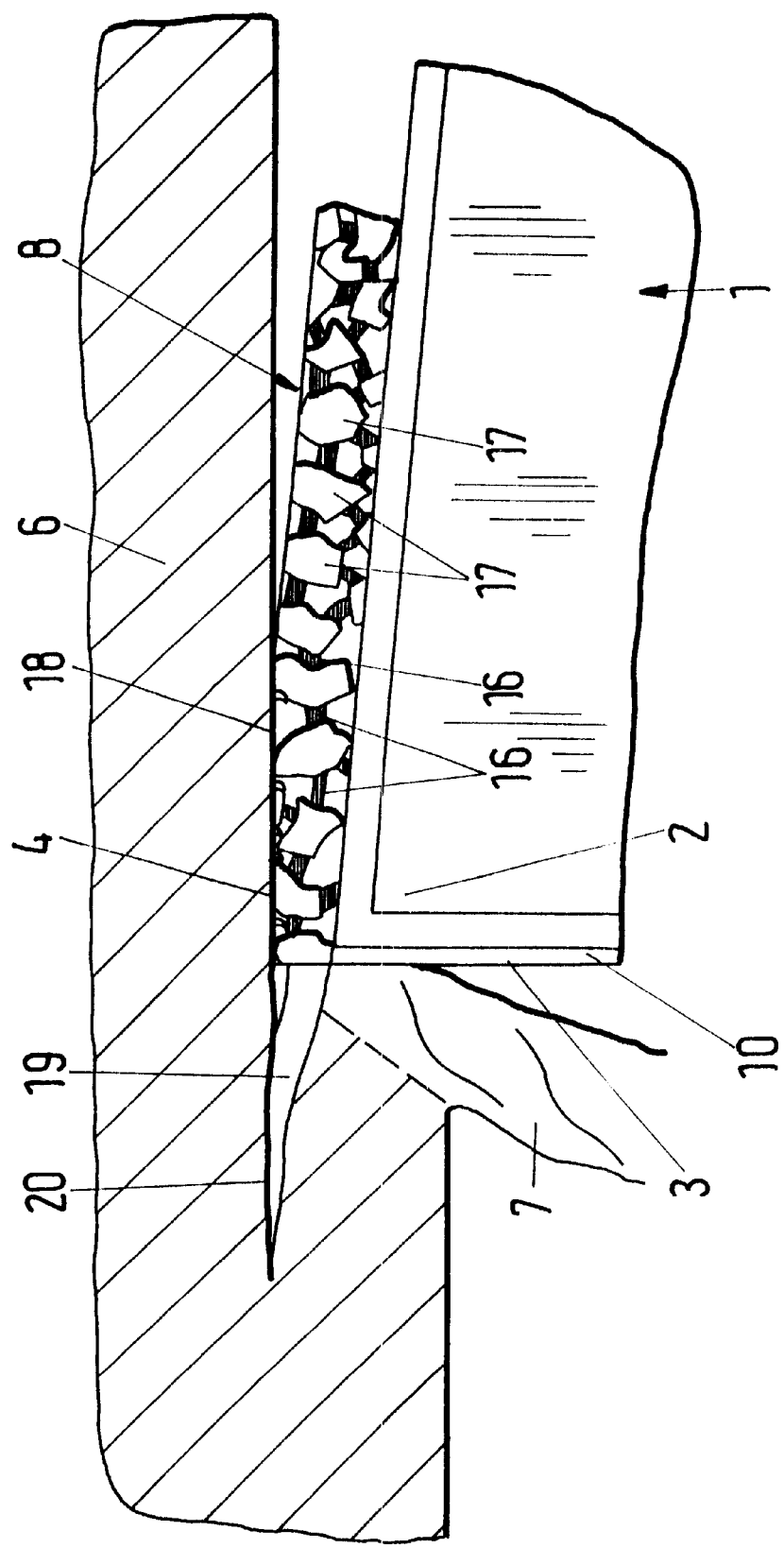
FIG. 2 shows an enlarged detail of the cutting wedge area of the inventive tool.

The present invention will now be described in detail with the aid of several specific embodiments utilizing FIGS. 1 through 3.

The tool, which is not shown in detail in the drawings, has at least one reversible cutting tip 1 which, in a manner known to a person skilled in the art, is connected to the tool holder. The reversible cutting tip 1 has a cutting wedge 2 which is provided with a first face 3 and a first flank 4. The wedge angle 5 (FIG. 1) is in the range of between approximately 70° and 95° and is preferably 90°. The clearance angle at the cutting wedge 2 is in the range between 0° and approximately 3°, preferably approximately 0°.

The cutting tip 1 is used for cutting a workpiece 6 whereby the cutting 7 is removed from the workpiece 6.

Since the first face 3 and first flank 4 during cutting of the workpiece 6 are loaded differently, they consist of different materials. The first flank 4 is provided by a coating 8 provided at the reversible cutting tip 1. The coating 8 has a thickness 9 of more than at least approximately 0.02 mm. Instead of a single coating it is also possible to provide a plurality of thin layers, together forming the coating 8.

The first face 3 has a coating 10 that has a greater mass proportion than the coating 8 of the first flank 4. The coating 10 is comprised of impact-resistant material with a wear-reducing surface, with a minimal roughness, insulating properties, and a minimal coefficient of friction. This ensures that the first face 3 is subjected only to minimal wear.

Since the first flank 4, when the tool is in use, has a greater effect on the workpiece quality than the first face 3, the first flank 4 is comprised of a cutting material or a cutting material combination that has a greater wear resistance and a greater hardness than the cutting material, respectively, cutting material combination of the coating 10 of the first face 3. Accordingly, the first face 3 and the first flank 4 can be adapted in an optimal manner to the desired cutting process of the workpiece 6. Accordingly, the material pairing at the cutting wedge 2 can be improved because the first face 3 and the first flank 4, because of their different loading situation, are respectively provided with especially adjusted cutting materials or cutting material combinations. Especially the first flank wear, which determines the surface quality and tolerance precision of the workpiece 6, can be reduced so that the quality and/or quantity of the workpieces 6 to be produced by the cutting tip 1 can be increased. A higher temperature resistance of the cutting edge can increase the effective cutting velocity between the tool and the workpiece 6 so that a productivity increase can be generated.

The angle 11 (FIG. 1) of the reversible cutting tip 1 is within the range of approximately −10° to approximately +15°. The first flank 4 has adjacent to the cutting edge 12 a section 13 which defines the clearance angle to the workpiece at approximately 0° and 3°. The section 13 has a transition into the first flank area 14 having a greater clearance angle 15 in the range between approximately 5° and 10°.

Onto the first flank 4 a very thick, wear-resistant coating 8 is applied which is machined by simple dressing, similar to the dressing of a grinding wheel, so that a highly precise tool is produced. After application of the coating 8 and before the first use of the cutting tip 1, respectively, of the tool, the first flank 4 is subjected to a deliberate cutting tip wear. The coating 8 comprises a binder 16 in which the wear-resistant cutting elements 17 are embedded. They are comprised of individual CBN mono crystals or similar hard material particles such as $Ae_2O_3$ (corundum), silicon nitrite, sapphire, natural or lab-created diamond crystals etc. The mono-crystalline cutting elements 17 have a diameter, respectively, a cross-sectional width within the magnitude of approximately 0.05 mm. The binder or bonding agent 16 allows over the service life of the reversible cutting tip 1 a sufficient attachment of the CBN mono crystals 17. When during machining of the workpiece 6 load peaks occur, the cutting elements 17, respectively, their cutting edges can elastically yield. The CBN elements 17 are provided only on those effective surfaces of the cutting wedge 2 which are subjected to minimal load peaks. The CBN elements 17 must exhibit great wear-resistance and high heat resistance. At the transition between the impact-loaded first face 3 and the first flank 4 a plurality of such CBN elements 17 is provided so that, when one of the elements 17 is worn, another element 17 is immediately available for further machining.

The matrix formed of the CBN mono-elements 17 and the binder 16 has a sufficiently high thickness that is advantageously greater than 50 μm and allows to perform the dressing process. This dressing process allows reduced sintering precision, reduced precision for attachment as well as reduced tip seating precision as a function of the respective cost savings. The bonding agent 16 can be, for example, nickel.

Each CBN element 17 has a cutting edge. The random failure probability of the cutting edge, due to the presence of multiple CBN elements 17 positioned at the cutting edge 12 and forming a surface, is decreased and allows an increased service life for the tool. When the first flank 4 of the cutting tip 1 is machined in the disclosed manner by circumferential dressing, the deflection forces resulting from the machining process are compensated for this pre-determined wear at the first flank 4 of the cutting tip by this special surface design. The cutting edge 12 is supported sufficiently by the coating matrix whereby the wear-resistance CBN elements 17 of the coating 8 provide minimal support action.

With the inventive tool, respectively, its inventive reversible cutting tips 1 a high quality workpiece surface is achieved already during roughing and removal of the cutting 7. This allows for a considerable shortening of the processing time with the elements 17 embedded within the coating 8 of the first flank 4 a cutting action with a geometrically defined cutting edge is performed at the cutting 7 and, at the same time, a material removal similar to grinding with geometrically undefined cutting edges is performed. The geometrically undefined cutting edges are formed by the edges of the mono crystalline wear-resistance elements 17. The actual workpiece material removal in the form of the cutting 7, however, is performed by the geometrically defined cutting edge 12.

The wear-resistant elements 17 are comprised preferably of CBN, which is a highly wear-resistant and heat-resistant cutting material. It is also possible to employ ceramic materials, diamond etc. The wear-resistant elements 17 embedded in the bonding agent 16 provide a grinding surface contact between the first flank 4 and the workpiece surface 18. This allows for smoothing of roughness peaks. In this manner, the workpiece 6 can be roughed and smoothed in a single process. It is no longer necessary to perform two processes for rough machining and fine machining.

The clearance requirement for the cutting tip 1 is to be kept as small as possible. It is even possible to allow for a cutting surface in the form of the surface section 13 at a radial-symmetrical body. This section 13 is positioned adjacent to the cutting edge 12. The first flank 4 provides a minimal support action. This is achieved by reducing to a minimum the portion of the cutting tip 1 penetrating into the workpiece surface 18, when a sufficient stabilization of the cutting edge 12 is realized. This is possible because of the individual mono-crystalline elements 17 embedded in the binder 16. The individual particles 17 with their edges positioned at the surface provide geometrically undefined cutting edges which allow to a limited extent a cutting or grinding process. These edges smooth the workpiece surface 18 directly subsequent to the removal of the cutting 7.

Despite the presence of the individual wear-resistant element 17, a sharp-edged cutting edge 12 is provided by the aforementioned dressing process after complete furnishing of the tool with the cutting tips 1. The resulting risk of cutting edge splintering is counteracted by the presence of the multitude of wear-resistant elements 17 forming the cutting edge 12. Within the section 13 (FIG. 1) of the first flank 4 the adjacently positioned (in the cutting direction) wear-resistant elements 17 form a cutting surface. Since these wear-resistant elements 17 are positioned on the same radius of the tool a following element 17 can replace an element 17 that has failed at the cutting edge 12. Since the wear-resistant elements are embedded in the binder 16, the wear-resistant elements 17 have a damping and spring-like (elastic) action in regard to impact and vibrations so that the tendency of splintering is reduced.

The thickness 9 of the coating 8 at the first flank 4 can be greater than 0.02 mm. Such a great thickness of the coating allows for increased elasticity of the elements 17 forming the cutting edge 12. By applying coatings with different particle sizes or with different deposition periods, a precise absolute dimension of the cutting edge 12 can be achieved which is formed by the multitude of the individual wear-resistant elements 17. Due to the minimal support of the surfaces 4, 13 vibrations between the workpiece 6 and the tool are dampened.

The tool furnished with the cutting tips 1 allows for a cutting process in which cutting velocity can be selected to be in the range between milling, turning, and grinding velocities, i.e., in the range between approximately 100 m/min and 2,000 m/min. Depending on the specific requirements for a coarse or fine cutting operation, the cutting velocity and the feed are adjusted relative to one another by the relative movement between the workpiece 6 and the tool.

Between the cutting edge 12 and the first flank 4 a short curved or planar cutting surface may be provided. In FIG. 1, a short planar cutting surface 13 is represented. Due to the disclosed predetermined wear by dressing the first flank 4, an increased machining precision of the cutting tip 1 is achieved. The first flank 4 is comprised of a plurality of geometrically undefined cutting edges which are formed by the edges of the wear-resistant elements 17. However, it is also possible that the first flank 4 is comprised of a plurality of geometrically defined cutting edges.

The cutting wedge 2, respectively, the cutting tip 1 can be produced as a wafer by sintering different cutting materials or cutting material combinations.

The tool, respectively, the cutting tip 1 is comprised of different materials which can be selected according to the loading during machining. These materials can be applied in layers whereby the different material layers may have different thickness. The reversible cutting tip 1 has a base body which, in the manner disclosed above, can be provided with at least one coating 10, respectively, 8, at the first face 3 and the first flank 4. At the first face 3 and at the first flank 4 different coating layers, differing in the type of layer as well as in the number of layers can be applied. These coatings 8, 10 themselves can also be comprised of a plurality of different layers. The coatings 8 and 10 are advantageously vapor-deposited onto the base body. For this purpose PVD (physical vapor deposition), CVD (chemical vapor deposition), and arc-PVD can be used. These methods, since they are known to a person skilled in the art, will not be explained in this context. PVD methods can achieve a coating of a thickness between approximately 2 $\mu$m and 5 $\mu$m CVD methods can achieve a thickness of up to approximately 12 $\mu$m to 15 $\mu$m, and arc-PVD can produce coatings of a thickness of up to approximately 50 $\mu$m. Depending on the desired thickness of the coatings 8 or 10, one of these methods is advantageously used.

However, it is also possible to fuse the different layers of the coatings 8 and 10 of cutting materials or cutting material mixtures by soldering or electroplating methods. It is also possible to employ flame spraying or laser spraying for different layers of cutting material or cutting material combinations or to employ plasma deposition to fuse the different layers with one another.

Figure 3:
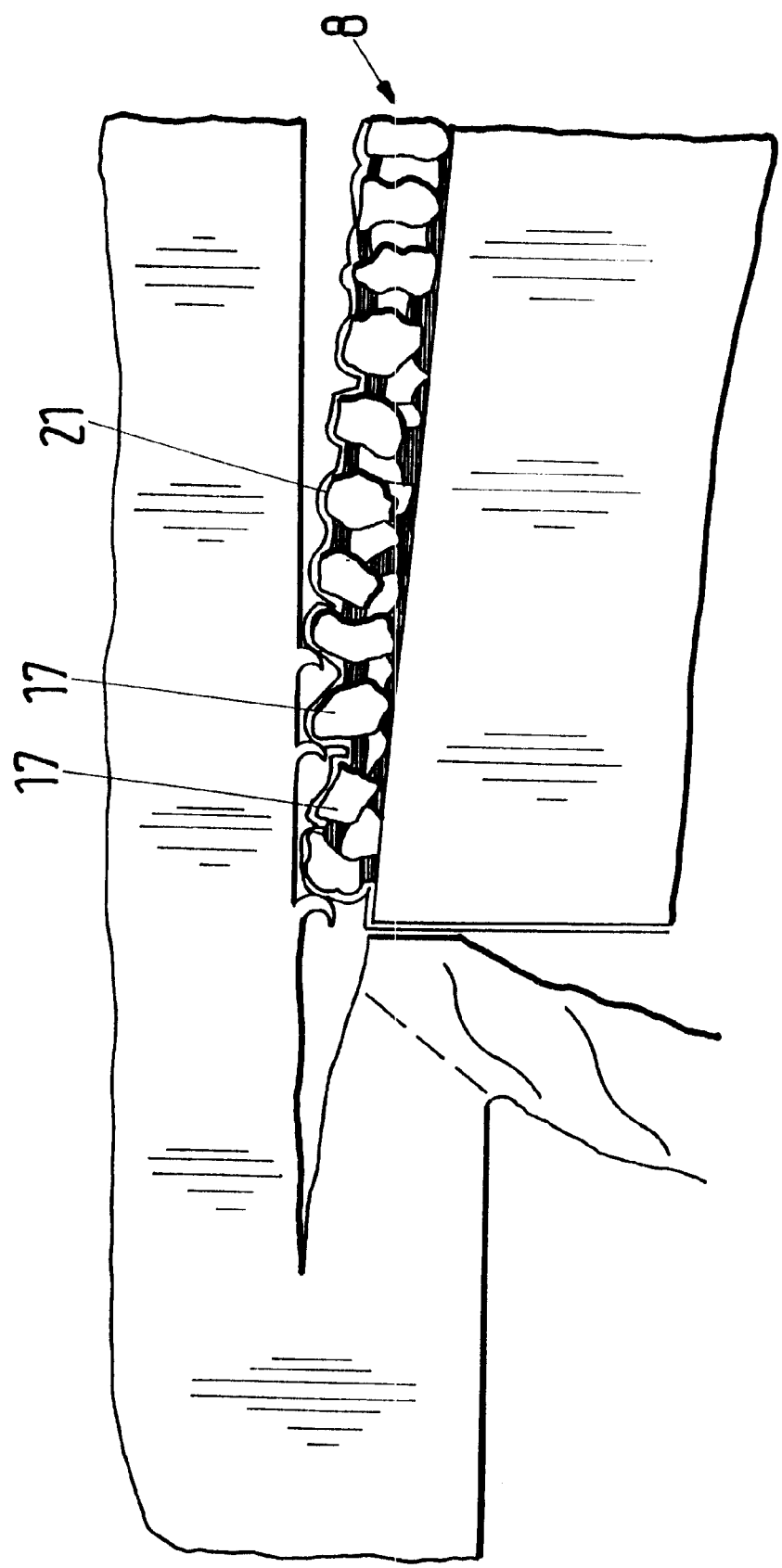
FIG. 3 shows in a second embodiment of the inventive tool a representation corresponding to FIG. 2.

FIG. 3 shows an embodiment in which a thin coating 21 is provided on the coating 8 with the wear-resistant elements 17. It is comprised of TiC, TiN, Al₂O₃, TiC etc. and is applied by a method disclosed in connection with the coating 8.

The cutting tips 1 can be used in tools which are to be used for turning, milling, broaching or broaching-milling. The individual cutting tips 1 are positioned at the circumference of the these tools either on a cylindrical mantle surface or any suitable contour having radial symmetry.

When the tool with the inventive reversible cutting tips 1 is used as a rotary tool, the first flanks 4, respectively, their flank surfaces 13 at the circumference of the tool can form a polygon. The surfaces 13 can be machined, in addition to the aforedisclosed grinding or dressing step, by laser or other dressing processes. A sharpening of this section 13 is possible. For producing the section 13 by dressing or sharpening, any suitable known grinding techniclogical method can be used in order to remove a certain component of the coating at the first flank. When the coating 8 at the first flank 4 is comprised in the aforementioned manner of wear-resistant elements 17 embedded in the elastic binder 16, a plurality of geometrically undefined cutting edges will result. They have, even for cutting velocities that correspond to those of milling operations, a smoothing effect onto the workpiece surface 18 to be machined. As can be seen in FIGS. 1 and 2, the cutting tip 1 with the cutting wedge 2 removes the cutting 7 from the workpiece. This cutting formation produces within the workpiece 6 an advancing crack 19 having a rough crack surface 20. This rough crack surface 20 is smoothed by the following section 13 by the plurality of geometrically undefined cutting edges, and this results in a polishing or grinding action. Accordingly, after the roughing process a finishing machining or smoothing step for the workpiece 6 by a separate tool is no longer needed. At the cutting edge 12 a pressure results that acts counter to the workpiece 6 so that the workpiece in this area is loaded inwardly. Since the wear-resistant elements 17 are embedded in the elastic binder 16, the loaded workpiece area can then return behind the cutting edge 12, respectively, behind the respective wear-resistant element 17. The subsequently arranged wear-resistant elements 17 can smooth the returned workpiece area in the aforementioned manner and can optionally even grind off material. A tool furnished with the inventive cutting tips 1 can thus machine the workpiece 6 in a single machining step with high precision and at minimal cost. Since at the reversible cutting tips 1 in the aforementioned manner a predetermined wear is predefined by the dressing process, a high machining precision can be achieved in a simple manner. By providing the predefined wear by dressing the surface and the section 13, the known service life characteristic of the cutting tip is fully taken advantage of. After 50% of radial wear of the cutting tip 1 it has only reached about 30% of its service life. Due to the substantially reduced cost of the cutting tip 1 the loss of up to 30% of the service life can be compensated. The radius of the cutting edge 12 can be very small so that during use the cutting tip 1 is subjected only to a minimal displacement load. The dressing step allows to produce an extremely sharp-edged cutting edge 12 so that the workpiece surface 18 machined therewith has very high precision. The grinding surface contact between the section 13 of the first flank 4 of the cutting tip 1 and the workpiece surface 18 also allows to smooth roughness peaks so that the machining precision is even more increased.

The machining precision can be further increased by increasing the machine stiffness mechanically or by control technological corrections. An increase of the cutting velocity during the cutting process results also in an increased machining precision. This is further improved by avoiding a gear load reduction resulting from a plurality of cutting tips 1 being engaged at the workpiece. The position precision of the cutting tips relative to the tool center can be increased. The cutting tips 1 can be ground with a precision of ±5 μm individually or in series. The seat at the tool can be precisely adjusted by adjusting elements to a tolerance of up to ±10 μm. By combining these measures, adapted to the respective application (turning, milling, milling-cutting, broaching, roughing, etc.) the cutting process can be substantially improved with respect to precision, economic feasibility etc. in comparison to known tools.

The simplest and most cost effective solution is to embody the reversible cutting tip 1 such that the clearance angle at the cutting wedge 2 is between 0° and 3°, preferably 0°. This clearance angle is produced by dressing the first flank 4 in the section 13. With this measure alone a substantially improved precision and economic feasibility in comparison to conventional reversible cutting tips 1 is achieved. In addition, the aforedisclosed further measures can be combined in many ways so that the machining precision and economic feasibility can be further improved.

The wear-resistant elements 17 which are preferably CBN mono crystals are provided only at the effective surfaces of the cutting tip 1 which are subjected to minimal impact but must exhibit great wear resistance and great heat resistance. This effective surface is the first flank 4. The transition between the impact-loaded first face 3 and the surface 13 coated with CBN crystals is defined by a redundance of the CBN particles determining the workpiece surface. This coating 8 is not embodied as a fine particle sintered cutting edge 12 but is comprised of individual mono crystals which have a sufficient moveability. The binder 16 allows an elastic embedding of the CBN particles 17 and allows a sufficient attachment of the CBN particles 17 over the service life of the reversible cutting tip 1. When impact loads occur, the cutting edges of the respective CBN particles 17 can yield in the disclosed manner. After the dressing process, the elastic matrix provides, due to wear, the minimal support action of area 13 of the first flank 4.

The specification incorporates by reference the disclosure of German priority document 197 42 765.0 of Sep. 27, 1997.

The present invention is, of course, in no way restricted to the specific disclosure of the specification and drawings, but also encompasses any modifications within the scope of the appended claims.

What is claimed is:

1. A method for cutting a workpiece with a tool having reversible cutting tips, each having a cutting wedge (2) defined by a first face (3) and a first flank (4), said cutting wedges (2) having a clearance angle of 0° to 3°, said method comprising the steps of:

providing a coating (8) on a surface of said first flank (4), said coating (8) comprising wear-resistant cutting elements (17) embedded in a binding agent (16), wherein said binding agent (16) forms an elastic matrix allowing said wear-resistant cutting elements (17) to elastically yield;

removing cuttings (7) from a workpiece (6) by said cutting tips (1);

immediately after the step of removing, smoothing a crack surface (20) of the workpiece (6), created by removing cuttings (7), with said wear-resistant cutting elements on said surface of said first flank (4) so that the workpiece (6) is roughed and smoothed in a single machining operation.

2. A method according to claim 1, wherein in said step of smoothing the crack surface (20) is acted on by a dressed surface of said first flanks (4).

3. A method according to claim 1, wherein in said step of smoothing the crack surface (20) is acted on by a plurality of geometrically undefined cutting edges of cutting elements (17) of said first flanks (4).

4. A method according to claim 1, wherein said step of smoothing is performed at a speed used for milling.

5. A method according to claim 1, wherein said step of removing cuttings is performed at a speed within a range used for turning, milling, and grinding.

6. A method according to claim 1, wherein in said step of removing cuttings, a cutting speed and a feed speed are adjustable relative to one another to achieve a selected coarseness or fineness of machining.

7. A method for cutting a workpiece, said method comprising the steps of:

providing a tool having at least one cutting tip, having a cutting wedge (2) defined by a first face (3) and a first flank (4), said first face (3) and said first flank (4) ending in a common cutting edge (12), said first flank (4) comprising a section (13) adjacent to said cutting edge (12), said section (13) defining a first clearance angle of 0° to approximately 3° and a second clearance angle, immediately adjoining said first clearance angle, of approximately 5° to 10°;

providing a coating (8) on a surface of said first flank (4), said coating (8) comprising wear-resistant cutting elements (17) embedded in a binding agent(16), wherein said binding agent (16) forms an elastic matrix allowing said wear-resistant cutting elements (17) to elastically yield;

cutting said workpiece with said tool;

removing cuttings (7) from said workpiece (6) by said cutting tip (1); and immediately after the step of removing, smoothing a crack surface (20) of the workpiece (6), created by removing cuttings (7), with said wear-resistant cutting elements on said surface of said first flank (4) so that the workpiece (6) is roughed and smoothed in a single machining operation.

8. A method for cutting a workpiece, said method comprising the steps of:

providing a tool having at least one cutting tip, having a cutting wedge (2) defined by a first face (3) and a first flank (4), said first face (3) and said first flank (4) ending in a common cutting edge (12), said first flank (4) comprising a section (13) adjacent to said cutting edge (12), said section (13) defining a first clearance angle of 0° to approximately 3°, said first face (3) differing from said first flank (4) by being comprised of different coating materials;

cutting said workpiece (8) with said tool;

removing cuttings (7) from said workpiece (6) by said cutting tip (1); and smoothing a crack surface (20) of the workpiece (6), created by removing cuttings (7) by said first flank (4).

9. A method for cutting a workpiece, said method comprising the steps of:

providing a tool having at least one cutting tip, having a cutting wedge (2) defined by a first face (3) and a first flank (4), said first face (3) and said first flank (4) ending in a common cutting edge (12), said first flank (4) comprising a section (13) adjacent to said cutting edge (12), said section (13) defining a first clearance angle of 0° to approximately 3°, said first face (3) differing from said first flank (4) by being comprised of different coating materials;

wherein the coating material (8) of said first flank (4) comprises wear-resistant cutting elements (17) embedded in a binding agent (16), wherein said binding agent (16) forms an elastic matrix allowing said wear-resistant cutting elements (17) to elastically yield;

cutting said workpiece (8) with said tool;

removing cuttings (7) from said workpiece (6) by said cutting tip (1); and immediately after the step of removing, smoothing a crack surface (20) of the workpiece (6), created by removing cuttings (7), with said wear-resistant cutting elements of said coating material (8) of said first flank (4) so that the workpiece (6) is roughed and smoothed in a single machining operation.

* * * * *